United States Patent [19]
Arnold

[11] 3,731,991
[45] May 8, 1973

[54] REFLECTING MEANS FOR BEAM CONTROL UTILIZING MOVABLE MEMBERS FOR ADJUSTMENT

[75] Inventor: Joe F. Arnold, North Palm Beach, Fla.

[73] Assignee: United Aircraft Corporation, East Hartford, Conn.

[22] Filed: Mar. 3, 1969

[21] Appl. No.: 804,385

[52] U.S. Cl. ................. 350/294, 330/4.3, 331/94.5
[51] Int. Cl. ............................................... G02b 5/10
[58] Field of Search ................... 350/288, 296, 304, 350/295, 294; 331/94.5

[56] References Cited

UNITED STATES PATENTS

| | | | |
|---|---|---|---|
| 3,493,894 | 2/1970 | Patel | 331/94.5 |
| 3,457,417 | 7/1969 | Bushsbaum et al | 250/199 |
| 2,759,106 | 8/1956 | Wolter | 350/294 |
| 3,224,330 | 12/1965 | Kompfner | 350/294 |
| 3,453,425 | 7/1969 | Whitaker | 350/294 |

Primary Examiner—Carl D. Quarforth
Assistant Examiner—J. M. Potenza
Attorney—Jack N. McCarthy

[57] ABSTRACT

A reflecting device having a housing with a fixed body and a second movable body mounted thereon, each body having a reflecting passage means extending therethrough with each passage having an axis. Said second movable body being mounted so that the axes of each passage means can be aligned and the distance between the fixed body and movable body can be controlled. Each reflecting passage has a small diameter opening and a large diameter opening intersecting the sides of its respective body. In their mounted position the small diameter openings face each other. The surface of the reflecting passage means of said second movable body being formed so that an input beam entering the large diameter opening will have the rays of the beam focused so as to pass through the small diameter opening and have the focal point lie outside the first passage. The surface of said reflecting passage means of said first body being formed as a reflecting surface so that the beam leaving the focal point will have the rays deflected to form a collimated beam of a different diameter than that of the input beam. When this device is used as an aerodynamic window in a gas dynamic laser, the output beam can be of the same diameter as the input beam.

4 Claims, 3 Drawing Figures

PATENTED MAY 8 1973  3,731,991

INVENTOR
JOE F. ARNOLD
BY Jack N. McCarthy
AGENT

REFLECTING MEANS FOR BEAM CONTROL UTILIZING MOVABLE MEMBERS FOR ADJUSTMENT

BACKGROUND OF THE INVENTION

Available devices normally used for expanding or condensing beams are either unsuitable or undesirable for controlling high energy laser beams for the following reasons:

1. Refractive techniques are impractical because available materials will not withstand the energy levels to be transmitted without deterioration or failure. Effective cooling of large refractive elements is impractical.

2. Classical reflecting devices either induce astigmatism or abberations, require off-axis elements to be made from parabolic elements made large (2 to 3 times beam diameter) relative to output beam diameter, are relatively large because of long focal length reflectors and their resulting spacing, or require supporting an element in the high energy beam.

This device overcomes these deficiencies.

SUMMARY OF THE INVENTION

This invention relates to a means for reflectively expanding or condensing a beam of intense electromagnetic radiation. This device will perform at beam intensity levels that will not permit the use of refractive techniques.

This device employs large surface area reflectors which reduce the surface intensity and make them easier to cool effectively. The reflector shapes have a higher resistance to distortion than designs using near-flat reflectors.

This device will be more compact and lighter in weight than the classical reflecting designs, permitting more versatile packaging. Its compactness and light weight infer inherent rigidity which will allow improved performance and durability.

This device, when used with an amplifier laser, presents no surfaces normal to the input beam that could permit damaging oscillation.

This device does not require position a reflector in the beam with a cooled supporting system that absorbs or disperses part of the beam.

The energy loss at long range, due to the unworked portion of the beam passing through the center hole, is less than other non-oscillating on-axis designs. This is true because the hole can be made smaller than the non-oscillating feature of other designs.

This device has a minimum size orifice which is advantageous when used with a low pressure laser cavity in that it minimizes the inflow of external gases.

DESCRIPTION OF THE PREFERRED EMBODIMENT

Figure 1:
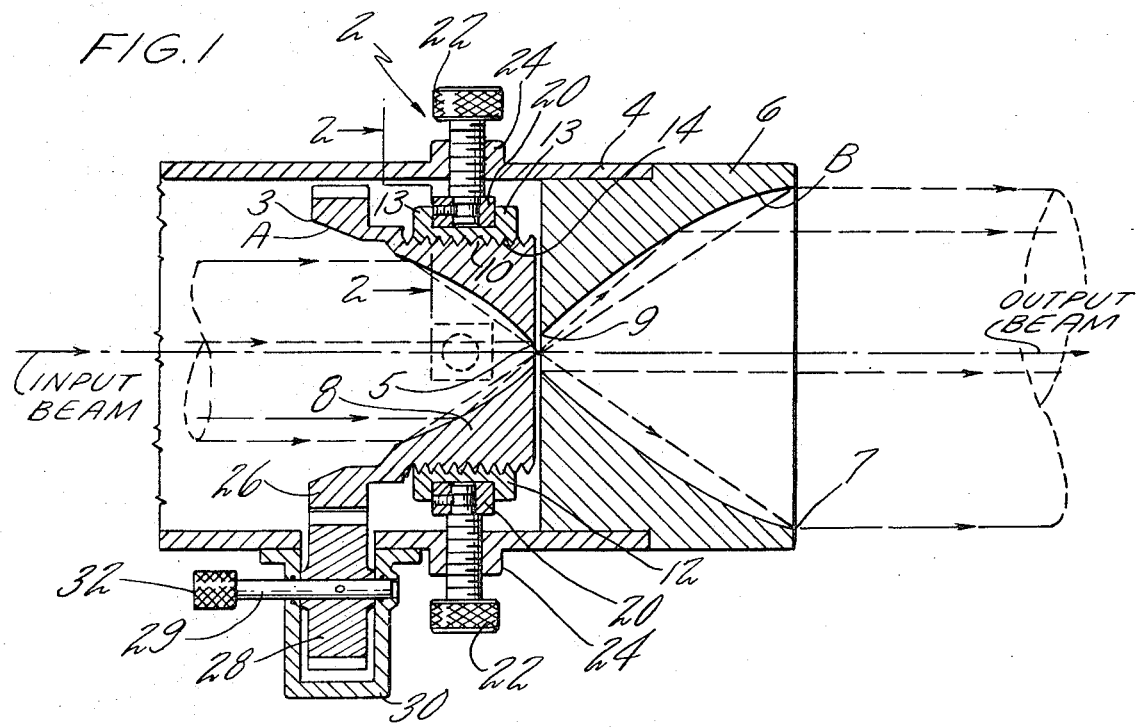
FIG. 1 is a sectional view in elevation showing the passage of a controlled beam.
Figure 2:
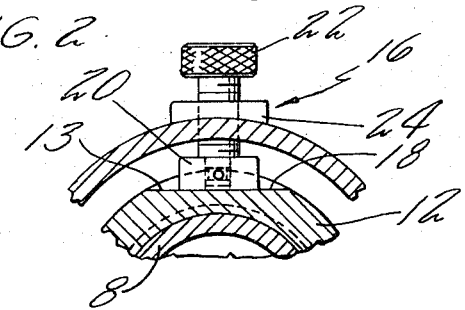
FIG. 2 is a view taken along the line 2—2 of FIG. 1.

Referring to FIG. 1, a device is shown having two reflecting surfaces A and B. Surface B is formed in a body 6 which is fixedly mounted to a housing 4 while reflecting surface A is formed in a body 8 which is mounted for transverse adjustment and longitudinal movement with respect to housing 4 and body 6 in a manner to be hereinafter disclosed. The reflecting surface A is positioned in its body 8 so that each end intersects an outer end of the body. This forms two openings, a large diameter opening 3 and a small diameter opening 5. The reflecting surface B is positioned in its body 6 so that each end intersects an outer end of the body. This forms two openings, a large diameter opening 7 and a small diameter opening 9.

The reflecting surface A has a shape that is generated by the rotation of a conic section about its axis. This shape may be a paraboloid, hyperboloid, ellipsoid, or a combination of these whose focal point falls outside the small diameter opening. A reflecting surface A in its construction would be so designed, for each application, that its large diameter opening would be matched to an input beam diameter. The reflecting surface B also has a shape generated in a manner as surface A but it has its focal point located such that at any relative position of reflecting surface A and reflecting surface B employed, all rays passing through the focal point of reflecting surface A will be intercepted by reflecting surface B and reflected at the desired angle. Reflecting surface B will be so designed that its large diameter opening will be matched to the desired output beam. The small diameter openings 5 and 9 of both reflectors will be designed to minimum possible common size to minimize unworked throughput. The planes of the ends of each reflecting surface must be perpendicular to its axis.

When used as an expander or condenser the input beam is directed into a large end of the reflecting surface A. The beam is then reflected off the surface through the common focal point and onto the surface of reflecting surface B. This beam is then reflected parallel to the reflectors common axis and it emerges from the device expanded or condensed in diameter. An expanded beam is useful for minimizing the diffraction spreading during transmission. A condensed beam is useful for high intensity applications. By slightly displacing the focal points the beam may be focused or defocused.

The body 8 is formed having an outer section 10 threaded at one end. A collar 12 is threaded internally at 14 to receive the threaded section 10 of body 8. It can be seen that relative rotation of body 8 with collar 12 would provide axial movement of the body if the collar is fixed.

The body 8 has four guide means 16 for allowing axial alignment of the body 8 to the body 6. Flats 18 are placed in the body at each guide means location. The flats are each placed 90° apart and left with upstanding sides 13. A block 20 fits on each flat 18 and is slideable between its cooperating sides. Bolts 22 are located about the housing 4, one each in a boss 24 spaced equally about the housing on the same plane. Each bolt threadably engages a block 20. A set screw keeps the bolt ends in its respective block so that the block moves with its cooperating bolt. It can be seen that operation of diametrically opposed bolts will alter the alignment of the body 8 with body 6.

The body 8 has a gear 26 fixed therearound. A drive gear 28 meshes with gear 26 and is mounted for rotation on a shaft 29 in a housing 30 extending from the main housing 4. The shaft 29 extends externally of the housing and has a knob 32 for rotating the drive gear 28. It can be seen that movement of the knob 32 will axially move body 6 with respect to body 8. While the bolts 22 and knob 32 are shown as being manually operable, automatic means such as electric motors can be used to control their rotation.

The reflecting surfaces A and B in operation must be positioned such that they are on a common axis and their large diameter openings face in opposite directions. Their focal points may be common, slightly separated, or overlapped. The variation in focal point positioning permits the following operations:

a. a common focal point transmits a collimated beam,
b. separated focal points defocus or over-expand the output beam,
c. overlapped focal points focus the output beam.

When high energy beams are to be controlled, the bodies 6 and 8, in which the reflecting surfaces A and B are to be formed, should be of materials having:

a. high thermal conductivity,
b. low thermal expansion coefficient,
c. high hardness,
d. high elastic modulus.

Materials considered for used in this regard include copper, tungsten, silicone, beryllium and aluminum.

The reflecting surfaces A and B are optically polished to attain diffraction limited reflectance. This means that the surface will not induce deviations greater than the diffraction angle of an unreflected collimated beam of the same diameter over the same range. Further, the reflecting surface should be coated with an appropriate material for maximum reflectivity at the required wave length. For installations where laser beams are to be controlled, the coating must have the capability to withstand the absorbed energy, the environment and maintenance. Such materials as vapor deposited gold, silver, aluminum, or copper could be utilized. Protective overcoats of dielectric films such as magnesium fluoride, thorium fluoride, and silicone monoxide could be used if necessary.

With devices using high energy beams as referred to above, it may be necessary to cool reflecting surfaces A and B by cooling of the bodies 8 and 6. This cooling could be accomplished by flowing a coolant through flow passages under the reflecting surfaces. A construction showing this type cooling is set forth in U.S. Pat. No. 3,645,608 for a Cooling Means for Reflecting Device to C. Staley and F. Staudt.

Figure 3:
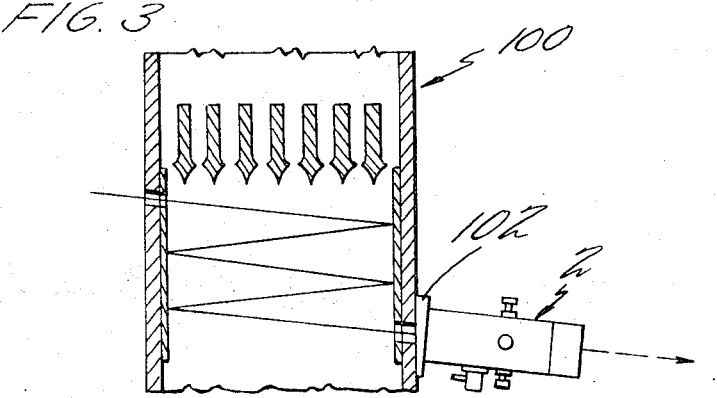
FIG. 3 is a view of the device shown as an aerodynamic window receiving a beam from a gas dynamic laser.

As shown in FIG. 3, a device 2 such as set forth is shown fixed to the side of a gas dynamic laser 100 for receiving a beam from the laser cavity. Attaching means 102 permits the axis of the device 2 to be aligned with the axis of the beam leaving the laser cavity of the gas dynamic laser 100. The small size of the small diameter openings permits this device to pass a beam from the interior of the laser device to the outside without the use of an aerodynamic window. An aerodynamic window is shown in U.S. application, Ser. No. 731,658, now U.S. Pat. No. 3,617,928.

I claim;

1. A reflecting device for a beam includes:
    a. a housing,
    b. a first body fixed on said housing,
    c. a second body mounted on said housing adjacent to said first body,
    d. said first body having a first passage therethrough,
    e. said first passage having a small diameter opening intersecting one surface of said first body and a large diameter opening intersecting another surface,
    f. said second body having a second passage therethrough,
    g. said second passage having a small diameter opening intersecting one surface of said second body and a large diameter opening intersecting another surface,
    h. the surface of one of said passages being formed as a first reflecting surface so that an input beam entering the large diameter opening will have the rays of the beam focused so as to pass through the small diameter opening and have the focal point lie outside the one passage,
    i. said first and second body being positioned adjacent each other with the small diameter openings facing each other,
    j. each of said passages having an axis,
    k. means for aligning said axes,
    l. the surface of the other passage being formed as a second reflecting surface so that the beam leaving the focal point will have the rays deflected to form a desired output beam,
    m. means for moving said first body in relation to said second body along said axes to control the position of the focal points of the first and second reflecting surfaces.

2. A device as set forth in claim 1 wherein the first and second bodies are positioned so that the first and second reflecting surfaces will have a common focal point thereby transmitting a collimated beam.

3. A device as set forth in claim 1 wherein the first and second bodies are positioned so that the first and second reflecting surfaces will have their focal points separated to defocus or overexpand the output beam.

4. A device as set forth in claim 1 wherein the first and second bodies are positioned so that the first and second reflecting surfaces have their focal points overlapped to focus the output beam.

* * * * *